United States Patent [19]

Hanamori et al.

[11] Patent Number: 4,693,580
[45] Date of Patent: Sep. 15, 1987

[54] MOTOR

[75] Inventors: Ryoichi Hanamori, Yokohama; Shigeo Nakashima, Kawasaki; Hiroshi Yamamoto, Yokohama, all of Japan

[73] Assignee: Canon Kabushiki Kaisha and Canon Seiki Kabushiki Ka:Sha, both of Tokyo, Japan

[21] Appl. No.: 815,010

[22] Filed: Dec. 31, 1985

[51] Int. Cl.⁴ .................. G03B 9/06; H02K 5/10; E01D 19/06
[52] U.S. Cl. .................. 354/271.1; 310/90; 384/282
[58] Field of Search .......... 310/90; 384/280, 281, 384/300, 301, 282, 461, 462, 909, 911; 354/271.1, 234.1, 235.1, 435, 440, 446, 451, 452

[56] References Cited

U.S. PATENT DOCUMENTS

| | | | |
|---|---|---|---|
| 3,161,449 | 12/1964 | Flom | 384/282 |
| 3,436,129 | 4/1969 | James | 384/282 X |
| 4,015,949 | 4/1977 | Baker et al. | 384/909 X |
| 4,472,039 | 9/1984 | Iwata et al. | 354/271.1 |
| 4,494,846 | 1/1985 | Kurosu et al. | 354/435 X |
| 4,574,213 | 3/1986 | Stevens | 310/90 |

FOREIGN PATENT DOCUMENTS

| | | | |
|---|---|---|---|
| 570336 | 2/1959 | Canada | 384/282 |
| 1007052 | 10/1965 | United Kingdom | 384/282 |

Primary Examiner—Donald A. Griffin
Attorney, Agent, or Firm—Fitzpatrick, Cella, Harper & Scinto

[57] ABSTRACT

A bearing member of a ring-shaped lubrication member made of a resin material is arranged between a ring-shaped stator having an excitation coil and pole teeth and a ring-shaped magnet rotor arranged inside of the stator, and the stator, magnet rotor and the lubrication member are held in union by holding members to form a motor.

7 Claims, 4 Drawing Figures

MOTOR

BACKGROUND OF THE INVENTION

1. Field of the Invention

The present invention relates to a motor, and more particularly to a motor adapted to be built in a lens barrel to drive a diaphragm vane or lens.

2. Description of the Prior Art

In a conventional stepping motor, an excitation coil and pole teeth can be constructed in a hollow structure and a magnet rotor can also be constructed in a hollow structure. Accordingly, it is suitable to drive a diaphragm vane or lens in a lens barrel.

A structure to drive the diaphragm vane by a drive force of the stepping motor is disclosed in Japanese Patent Application Laid-open 165825/1982.

When the diaphragm vane or the lens is to be driven, a power souce for the motor may be a battery in the lens barrel, a battery in a camera body or a battery separate from the camera body. None of those can store a large capacity of power supply energy. As a result, if a rotation efficiency between the rotor and the stator is low, the power supply energy is wasted and the product value of the lens with a built-in motor is lowered. If the rotation between the stator and the rotor is not smooth, the diaphragm vane and the lens may not be moved or rotated to a position determined by an exposure control system or an auto-focus system and it adversely affects the lens performance.

In the prior art stepping motor, the stator is fixed to an outer ring of a bearing, the magnet rotor is fixed to an inner ring of the bearing, and balls are arranged between the outer ring and the inner ring. Because of such a structure, the friction coefficient is high and the rotation efficiency is low. This manufacturing step is also time-consuming.

SUMMARY OF THE INVENTION

It is an object of the present invention to provide a motor having a lubrication member arranged between a rotor and a stator to smoothen the rotation of the rotor.

It is another object of the present invention to provide a motor having the structure of a bearing which is most fitted to the shape of a lens barrel.

Other objects of the present invention will be apparent from the description of a preferred embodiment of the present invention set forth hereinbelow.

DESCRIPTION OF THE PREFERRED EMBODIMENTS

One embodiment of the present invention is now explained with reference to FIG. 1. Numeral 1 denotes a stator which includes coils $1A_1$ and $1A_2$, pole tooth yokes $1B_1$ and $1B_2$ and a coil bobin $1C$. Numeral 2 denotes a magnet rotor arranged inside the stator 1 through a bearing ring 4, and numeral 6 denotes a hold ring for holding the stator 1, rotor 2 and the bearing ring 4 in union. The shape and structure of the coils, yokes and bobbin of the stator 1 and the magnet rotor have been known in the art and also are disclosed in the above-mentioned patent publication. Therefore, the explanation thereof is omitted here.

The bearing ring 4 is made of a material having a low friction coefficient and a self-lubrication property. It may be Delrin (trademark of DuPont) made of polyacetal resin filled with polyfluorocarbon short fiber, ultra-high molecular polyethylene, or polyphenylene sulphide (PPS).

When the ultra-high molecular polyethylene material is used for the bearing ring 4, an ultra-high molecular polyethylene belt or sheet may be applied to an inner periphery of the bobbin $1c$ of the stator 1 so that the thickness of the bearing member is reduced.

When an adhesive tape (fluorine resin) (tradename Nitfron in Japan) is used, the tape need not be applied to the entire periphery of the gap between the stator and the rotor but it may be intermittently applied.

Figure 2:
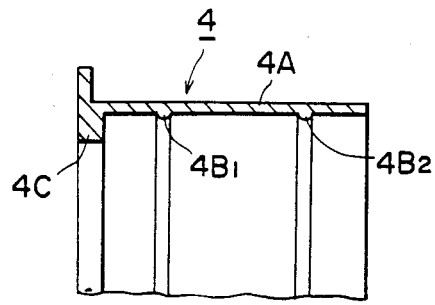
FIG. 2 shows a detail of a bearing shown in FIG. 1.

FIG. 2 shows a material such as Delrin which can be formed into the bearing member. Two or more ring-shaped projections $4B_1$, $4B_2$, ... are formed on an inner periphery of the ring 4A of the bearing 4, and a flange 4C is formed at an axial end of the ring 4A.

A stator is fixed to an outer periphery of the ring 4A of the bearing member 4 shown in FIG. 2. A hold ring 6 is fixed to a side of the stator so that the flange 6A (FIG. 1) extending along the inner periphery of the hold ring 7, the flange 4C of the be bearing and the ring 4A of the bearing define a space, into which the magnet rotor 2 is inserted. The magnet rotor 2 is supported by the ring-shaped projections $4B_1$, $4B_2$, ... of the bearing.

Figure 3:
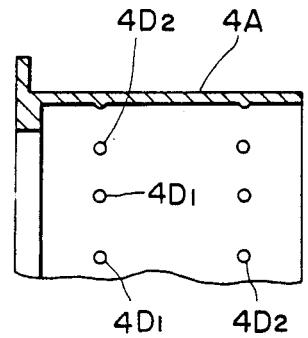
FIG. 3 is a modification of the bearing shown in FIG. 2.

FIG. 3 shows a modification of the bearing. It differs from the bearing of FIG. 2 in the area contacting the magnet rotor 2. In FIG. 3, instead of the ring-shaped projections $4B_1$, $4B_2$, ... shown in FIG. 2, intermittent projections $4D_1$ and $4D_2$ are concentrically formed on the inner periphery of the ring 4A. The magnet rotor is rotated while it is supported by the intermittent projections $4D_1$, $4D_2$, ....

The magnet rotor of the above motor is rotated by a rotation torque generated by energizing the coils $1A_1$, $1A_2$, .... Since the contacting surface of the bearing member 4 which contacts the surafce of the rotor has a low friction coefficient and a self-lubrication property, the magnet rotor rotates smoothly.

The stepping motor of the present embodiment does not need a separate bearing member and the movment of inertia of the rotor is reduced and the rotation speed is increased. When a brushless motor is used, the reduction of the moment of inertia improves the controlability.

Figure 1:
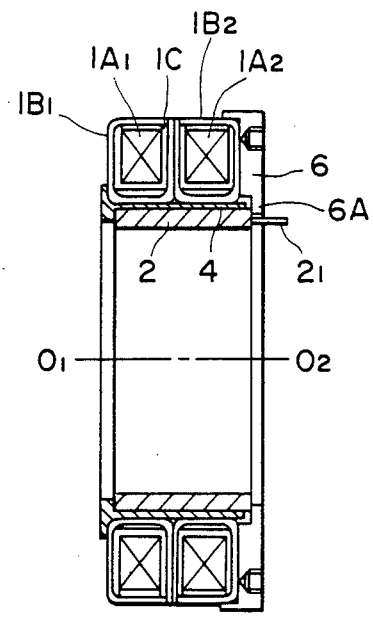
FIG. 1 is a lateral sectional view of one embodiment of a motor of the present invention.
Figure 4:
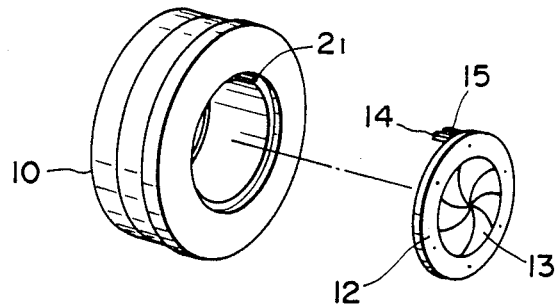
FIG. 4 shows the motor of FIG. 1 arranged in a lens barrel.

FIG. 4 shows a diaphragm mechanism of a camera which uses the motor shown in FIG. 1. The hollow motor 10 shown in FIG. 1 is arranged concentrically to a lens barrel (not shown). A pin 21 of the ring-shaped rotor 2 is fitted to a groove 15 of a lever 14 for driving diaphragm vanes mounted on a diaphragm mechanism, and the rotor 2 is rotated by an external signal to drive the lever 14 in one of the directions shown by arrows so that the diaphragm vanes 13 are driven to a desired aperture to control an intensity of light passing therethrough.

In accordance with the present invention, the ring shaped or belt-shaped lubricant member made of a resin material having a low friction coefficient is arranged between the stator and the rotor so that the thickness of the bearing member is significantly reduced. The motor of the present invention is suitable to be built in the lens barrel.

What we claim is:

1. A diaphragm mechanism of a camera comprising:
   a ring-shaped stator having an excitation coil;
   a ring-shaped magnet rotor arranged inside of said stator;
   a ring-shaped lubrication member made of a resin material interposed between said stator and said rotor to serve as a lubrication member;
   a ring-shaped hold member for holding said stator, said rotor and said lubrication member in union;
   diaphragm means; and
   coupling means for coupling said diaphragm means to said rotor.

2. A motor comprising:
   a ring-shaped stator having an excitation coil;
   a ring-shaped lubrication member made of a resin material;
   a ring-shaped magnet rotor arranged inside of said stator through said lubrication member; and
   ring-shaped hold member for holding said stator, said rotor, and said lubrication member in union.

3. A motor according to claim 2, wherein said hold member has a flange formed inwardly thereof, said ring-shaped lubrication member has a flange formed inwardly thereof, and the flanges of said hold member and said ring-shaped lubrication member define the movement of said magnet rotor in a thrust direction.

4. A motor comprising:
   a ring-shaped stator having an excitation coil;
   a ring-shaped lubrication member made of a resin material;
   a ring-shaped magnet rotor arranged inside of said stator through said lubrication member; and
   ring-shaped hold means for holding said stator, said rotor and said lubrication member in union, wherein said ring-shaped lubrication member has projections formed on an inner periphery thereof, and said magnet rotor is held in point contact with said projections.

5. A motor according to claim 4 wherein a sheet-like lubrication member made of a resin material having an adhesive layer on one side is fixed to each of an inner periphery of said stator and an outer periphery of said magnet rotor, to hold said stator.

6. A motor according to claim 5, wherein at least one of the sheet-like lubrication materials applied to the inner periphery of said stator and the outer periphery of said magnet rotor is split to reduce an area of the lubrication members.

7. A hollow motor coaxially disposed in a lens barrel of a camera and provided for driving a diaphragm thereof, comprising:
   a ring-shaped stator having an excitation coil;
   a ring-shaped lubrication member made of a resin material;
   a ring-shaped magnet rotor arranged inside of said stator through said lubrication member, said magnet rotor having a connecting portion for actuating said diaphragm; and
   ring-shaped hold means for holding said stator, said rotor and said lubrication member in union.

* * * * *

UNITED STATES PATENT AND TRADEMARK OFFICE
CERTIFICATE OF CORRECTION

PATENT NO. : 4,693,580
DATED : September 15, 1987
INVENTOR(S) : R. HANAMORI, ET AL.

It is certified that error appears in the above-identified patent and that said Letters Patent is hereby corrected as shown below:

On the title page

AT [73] ASSIGNEE:

"Ka:Sha" should read --Kaisha--.

AFTER [22] FILED DEC. 31, 1985:

Insert:

--[30]  Foreign Application Priority Data
    Jan. 12, 1985 [JP]  Japan ...... 60-2654--.

COLUMN 1

Line 64, "bobin" should read --bobbin--.

COLUMN 2

Line 14, "1c" should read --1C--.
Line 29, delete "be".
Line 45, "surafce" should read --surface--.
Line 49, "movment" should read --moment--.
Line 52, "controlabil-" should read
    --controllabil- --.
Line 65, "ring" should read --ring- --.

UNITED STATES PATENT AND TRADEMARK OFFICE
CERTIFICATE OF CORRECTION

PATENT NO. : 4,693,580
DATED : September 15, 1987
INVENTOR(S) : R. HANAMORI, ET AL.

Page 2 of 2

It is certified that error appears in the above-identified patent and that said Letters Patent is hereby corrected as shown below:

COLUMN 3

Line 23, "ring-shaped" should read --a ring-shaped--.

COLUMN 4

Line 11, "4 wherein" should read --4, wherein--.

Signed and Sealed this

Fifteenth Day of March, 1988

Attest:

DONALD J. QUIGG

*Attesting Officer*

*Commissioner of Patents and Trademarks*